CHARLES A. BOYNTON.
Improvement in Fruit-Dryers.

No. 125,929.                          Patented April 23, 1872.

Witnesses:
John Becker
Geo. W. Mabee

Inventor:
C. A. Boynton
per
Attorneys.

125,929

UNITED STATES PATENT OFFICE.

CHARLES A. BOYNTON, OF VINELAND, NEW JERSEY.

IMPROVEMENT IN FRUIT-DRIERS.

Specification forming part of Letters Patent No. 125,929, dated April 23, 1872.

Specification describing a new and Improved Fruit-Drying Apparatus, invented by CHARLES A. BOYNTON, of Vineland, in the county of Cumberland and State of New Jersey.

Figure 1:
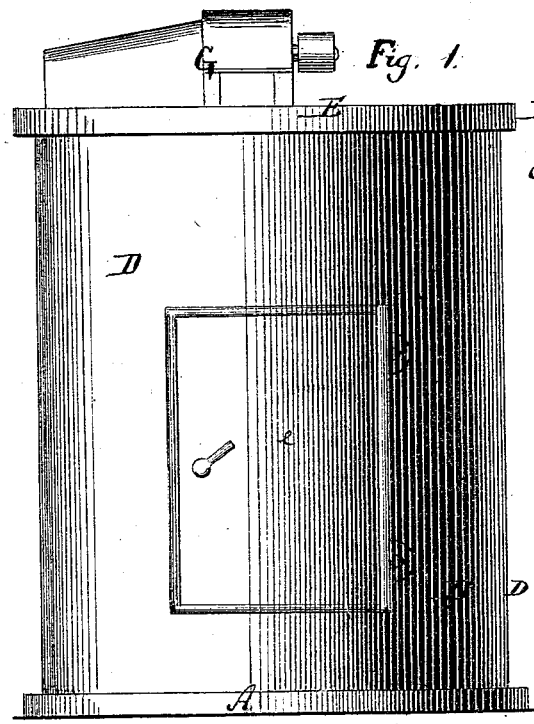
Figure 2:
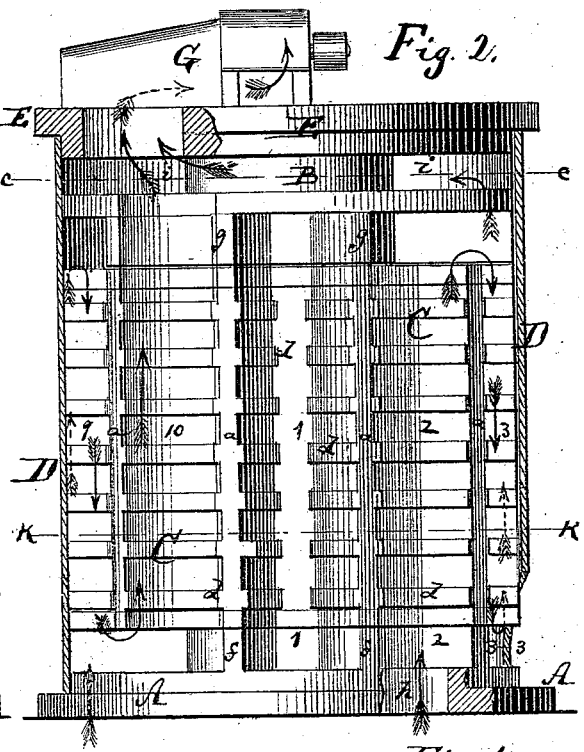
Figure 3:
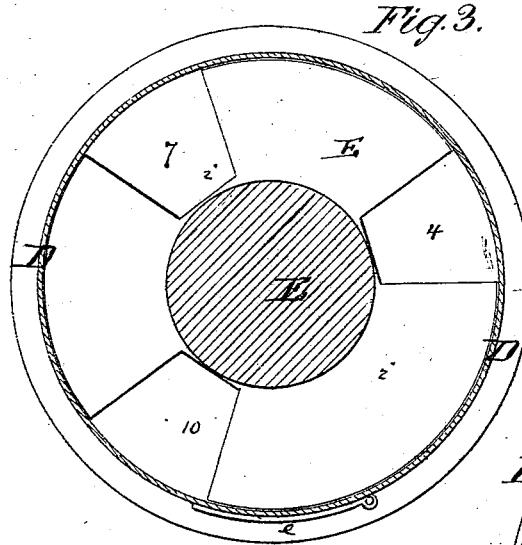
Figure 4:
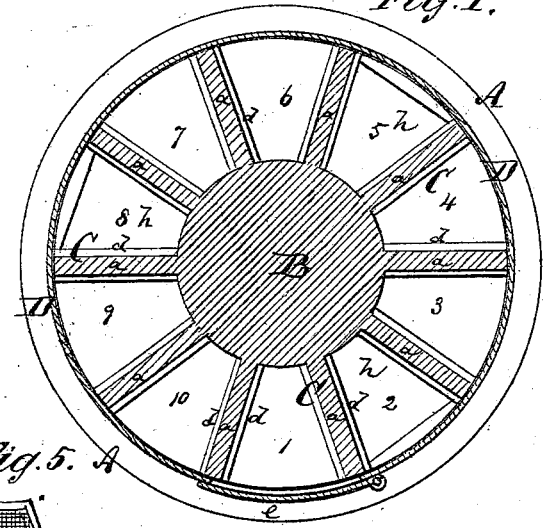
Figures 5, 6:
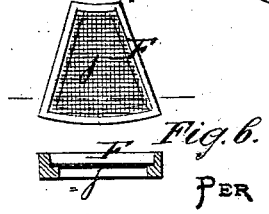

Figure 1 represents a side elevation of my improved fruit-drying apparatus. Fig. 2 is a side elevation of the same, with the outer shell in section. Fig. 3 is a horizontal section on the line $c\ c$, Fig. 2; Fig. 4, a horizontal section on the line $k\ k$, Fig. 2; Fig. 5, a top view of one of the shelves; and Fig. 6, a transverse section of the same.

Similar letters of reference indicate corresponding parts.

This invention relates to an improved apparatus for rapidly drying fruit and vegetables for preservation; and consists in the arrangement of a rotary rack that contains the fruit-supporting shelves, with stationary top and bottom plates and conduits, whereby a series of up-and-down hot-air passages through the several shelves is obtained, exposing all the fruit in the apparatus to varying degrees of heat according to its distance from the place where it was put in. The invention also consists in the combination, with the apparatus, of a fan, by means of which air is drawn through the apparatus with desired effect.

A in the drawing represents the circular base of my improved fruit-drier. In its center is the supporting step or socket for the shaft or stem B of the rotary rack C. Near its edge the base supports the circular shell D, which entirely surrounds the rack C, and which serves as a support for the immovable circular top E of the apparatus. The upper end of the shaft or stem B enters the top E, and has additional bearing therein. The rack C is formed by a series of partitions, $a\ a$, which project radially outward from the stem B, so that their outer edges will be close to the stationary shell D, as is clearly shown in Fig. 4. The partitions $a$ contain on their sides projecting ribs $d\ d$, upon which the fruit-supporting shelves F are placed. There are, in Fig. 4, shown to be ten such segmental spaces between as many partitions $a$. That one of these spaces (1) which chances to be directly behind a door, $e$, in the shell D has its sides $a$ in line with projecting ribs $f f$ on the base, and with pendent ribs $g\ g$ on the top E, as in Fig. 2, and is therefore not in atmospheric communication with the other spaces. The next space (2) to it, however, communicates at the lower end with a hole, $h$, cut through the base A for the admission of hot air, and at the upper end, by a recess in E, with the next adjoining space 3, whose lower end in turn connects with the space (4) next to it, so that the air admitted through $h$ will ascend through the space 2, descend in 3, and again ascend in 4, finally escaping from the latter to a recess, $i$, in the top E, which communicates with a fan, G, whereby the air is drawn through the several spaces, and finally discharged. The next three spaces, 5, 6, and 7, are again, in relation to each other, the same as 2, 3, and 4, and so are the last, 8, 9, and 10, there being thus three holes $h$ in the base, one under each of the spaces marked 2, 5, and 8.

The shelves are filled with fruit through the open door $e$ in the space 1, and the rack then turned to bring the filled shelves in line with the space marked 2. The hot air, ascending through slices or pieces of fruit, takes off the moisture, but is apt to bend or curl the pieces upward. Therefore, in the next line of current the air is brought from above through the shelves, and counteracts such influence by rebending the pieces straight, and so on. The air at its several entrances to the apparatus may be so regulated as at first to be more heated than at the second entrance, and there more than at the third, thus exposing the fruit to a constantly-diminishing degree of temperature.

The number of spaces in the rack may be more or less varied in larger or smaller apparatus.

The shelves F are made of wooden frames, with cords or threads $j\ j$ drawn across. I have found by frequent tests that cotton or other thread is the best support for the fruit, as metal oxidizes and discolors the slices.

Having thus described my invention, I claim as new and desire to secure by Letters Patent—

1. The rotary rack C, arrranged between the stationary base A, top E, and shell D, the base having the ribs $f$ and holes $h$, and the top having the ribs $g$ and recesses to produce air-currents, substantially as herein shown and described.

2. The fan G, in combination with the subject-matter of the foregoing clause, as specified.

CHAS. A. BOYNTON.

Witnesses:
A. V. BRIESEN,
T. B. MOSHER.